United States Patent [19]

Griesshammer et al.

[11] Patent Number: 4,515,762
[45] Date of Patent: May 7, 1985

[54] PROCESS FOR PROCESSING WASTE GASES RESULTING DURING THE PRODUCTION OF SILICON

[75] Inventors: Rudolf Griesshammer, Burghausen; Franz Köppl, Altötting, both of Fed. Rep. of Germany; Winfried Lang, Ach, Austria; Ernst Mühlhofer, Sulzberg/Allgäu; Michael Schwab, Neuötting, both of Fed. Rep. of Germany

[73] Assignee: Wacker-Chemitronic Gesellschaft Für Elektronik-Grundstoffe mbH, Burgenhausen, Fed. Rep. of Germany

[21] Appl. No.: 442,145

[22] Filed: Nov. 16, 1982

[30] Foreign Application Priority Data

Feb. 4, 1982 [DE] Fed. Rep. of Germany ....... 3203743

[51] Int. Cl.³ .................. C01B 33/113; C01G 17/02; C01G 23/07
[52] U.S. Cl. .................................. 423/337; 423/486; 423/613; 423/618; 55/71
[58] Field of Search ................ 423/240 S, 240 R, 248, 423/337, 481, 486, 488, 509, 613, 618; 55/71

[56] References Cited

U.S. PATENT DOCUMENTS 3,954,945  5/1976  Lange et al. ................. 423/337

FOREIGN PATENT DOCUMENTS 149054  6/1981  Fed. Rep. of Germany ...... 423/240

Primary Examiner—Earl C. Thomas
Assistant Examiner—Jeffrey E. Russel
Attorney, Agent, or Firm—Collard, Roe & Galgano

[57] ABSTRACT

Waste gases resulting from the production of silicon in connection with the formation or decomposition of chlorosilanes, which gases always contain hydrogen chloride, can be worked up without removal of the hydrogen chloride. For this purpose, the waste gases which, after separation from the chlorosilanes, only contain hydrogen and hydrogen chloride, are subjected to combustion with addition of air and, after addition of silicon tetrachloride, the result being highly dispersed $SiO_2$. The hydrogen chloride then remaining in the gaseous phase is returned to the process stream for production of trichlorosilane.

4 Claims, 1 Drawing Figure

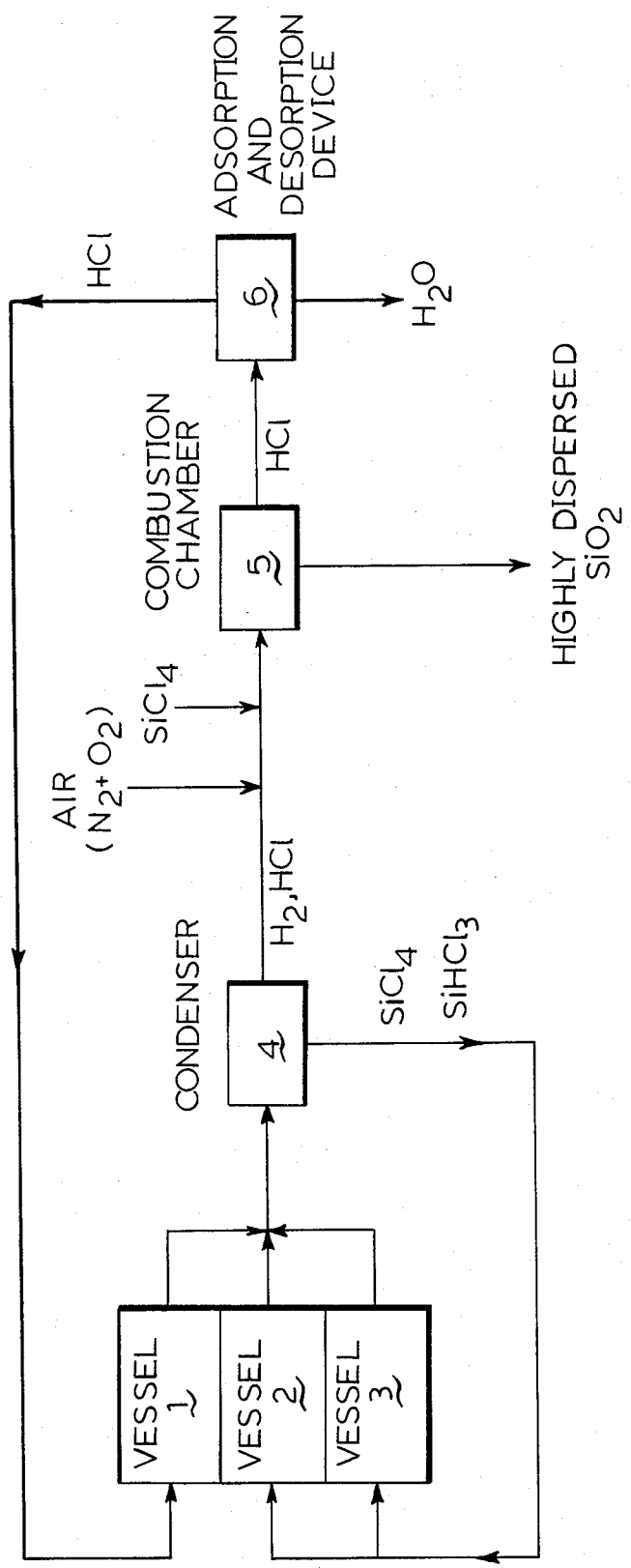

PROCESS FOR PROCESSING WASTE GASES RESULTING DURING THE PRODUCTION OF SILICON

The invention relates to a process for processing waste gases resulting in the production of silicon by thermal decomposition of a gas mixture consisting of chlorosilanes and hydrogen on heated carrier bodies; the waste gases are formed while the chlorosilanes are produced or decomposed.

Pure silicon is usually obtained by thermal decomposition of chlorosilanes, especially trichlorosilane, on heated carrier bodies in the presence of hydrogen. In this process, a waste gas mixture results, which contains unreacted trichlorosilane, newly-formed silicon tetrachloride, hydrogen and hydrogen chloride. Similarly composed waste gases are obtained in connection with silicon deposition, such as in the conversion of silicon tetrachloride with hydrogen to form trichlorosilane, a compound more suitable for the deposition of silicon; the gas mixture is also formed in the production of trichlorosilane by the reaction of silicon with hydrogen chloride.

As a rule, gas mixtures of this kind were formerly processed by hydrolysis with decomposition of the silanes and simultaneous dissolution of the hydrogen chloride in water, so that only hydrogen—though in moist condition—remained in the gaseous phase, without being further used. At present, however, the tendency is to recover the valuable chlorosilanes contained in the waste gases without decomposition and to return them into the process, at the same time using once more the remaining hydrogen and hydrogen chloride.

According to DE-OS (German Offenlegungsschrift) No. 29 18 060, it is conventional for that purpose, e.g., to condense as liquids the chlorosilanes contained in the gas mixture, whereupon hydrogen chloride is obtained in frozen form from the remaining gas mixture, so that only hydrogen remains in the gaseous phase. According to another method described in DE-OS No. 29 18 078, chlorosilanes and hydrogen chloride are made to freeze out together in solid form and therefrom hydrogen chloride is recovered by evaporation. According to the last mentioned method, again, finally only hydrogen remains in the gaseous phase. In a similar manner, the chlorosilanes can be condensed as liquids and hydrogen chloride dissolved in the silicon tetrachloride contained in the condensate. All these methods have the common feature that hydrogen chloride has to be separated from the remaining gaseous phase, which makes a separate process step necessary.

It is the object of the present invention to provide a process which makes it possible to process the waste gases resulting in the silicon deposition process, after separation of the chlorosilanes contained therein, without using a separate step for hydrogen chloride removal.

Other objects and advantages of the process of the invention will become apparent from the following description.

The object of the invention is accomplished by a process in which, to begin with, the chlorosilanes contained in the waste gases are subjected to condensation, whereupon an oxygen-containing gas mixture is added to the remaining waste gas mixture, and finally the so-formed mixture, to which is added suitable halides, is burnt, resulting in the pyrogenic preparation of oxides of fine particle size.

The waste gas mixtures to be used in the process of the invention are mostly those which are obtained in presentday conventional silicon deposition processes, i.e., in the deposition of silicon on heated carrier bodies by decomposition of trichlorosilane, or in the conversion of silicon tetrachloride into trichlorosilane and, in general, in the production of trichlorosilane, although generally other chlorosilanes, hydrogen chloride and hydrogen-containing gas mixtures can be used. In carrying out the processes, either individual waste gases or mixtures of such gases can be processed.

In carrying out the process according to the invention, it is important to provide an approximately constant hydrogen proportion in the mixture in order to guarantee a uniform heating value in the resulting heating gas; this also ensures the uniform quality of fine particle size of the oxides which are sensitive to changes in the condition of their preparation. It is favorable that the proportion of hydrogen in the waste gases of the different processes, though of varying amount, is, on the whole, comparatively constant. It is therefore possible to use the waste gases resulting from different processes individually and, e.g., to manufacture fine particle-size oxides of different quality according to the hydrogen content in the heating gas. Another possibility consists of mixing different waste gases, e.g., with the aid of appropriate dosing apparatus in such a manner that a substantially constant hydrogen content will be present in the waste gas mixture. A third possibility consists, e.g., in introducing hydrogen from an external source, in case the proportion of hydrogen in a waste gas or waste gas mixture is fluctuating, thereby ensuring the maintenance of a constant and sufficient hydrogen proportion in the heating gas. Finally, an admixture with hydrogen chloride or an inert gas may also be used to regulate the hydrogen proportion.

As mentioned before, the first step in the processing of the waste gas consists of removing the chlorosilanes contained in the waste gas or waste gas mixture. This can be done, e.g., by freezing them out, or more advantageously, by condensing them in liquid form, using means conventional in refrigeration, for instance coolers using Freon or other cooling liquids or suitable electric cooling aggregates. Since in the process according to the invention the hydrogen chloride remains in the gaseous phase, expensive insulating and cooling devices for reaching deep temperatures, such as the ones required for freezing hydrogen chloride, can be dispensed with.

The condensed chlorosilanes can be removed from the system continuously or in batches and can be worked up, e.g., by distillation. The trichlorosilane thus resulting can be, e.g., returned into the silicon deposition process, the tetrachlorosilane into the conversion process.

After the removal of the chlorosilanes, there remain in the gaseous phase as main ingredients, hydrogen and hydrogen chloride, with small amounts of chlorosilane residue. Typical values are for example:
In the waste gas from the silicon deposition process,
    about 90 vol % H, and
    about 6–9 vol % HCl;
In the waste gas from the silicon tetrachloride conversion process,
    about 85 vol % H, and
    about 10–14 vol % HCl; and In the waste gas from the trichlorosilane production process,
about 75 vol % H, and
about 20-25 vol % HCl.

Depending on the type of work-up of the waste gases—namely, whether as individual gas streams or in mixtures, an effective amount of oxygen is added for generating an oxyhydrogen flame; generally, oxygen is added in excess of the stoichiometric amount. In principle, pure oxygen is added, but it is also possible to add a mixture with an inert gas or inert gases, e.g., nitrogen, but particularly advantageous is the addition of air or air/oxygen mixtures.

The hydrogen content in the waste gas can be determined by conventional analytical methods, for instance, gas chromatography, or by means of IR detectors. The residual amount of chlorosilanes can be controlled continually, e.g. by thermal conductivity. Furthermore, an especially simple control method is the determination of the HCl-content by titration of the waste gas which allows one to derive therefrom, indirectly, the proportion of the hydrogen present. Depending on this value, e.g., additional hydrogen can be introduced, or the required amount of air added, if facilities for these measures are provided.

It should be mentioned in this connection that reproducible pressure conditions should be provided in the system by adequate pressure regulation, e.g., by compressors, screw condensers, or pressure reducing devices. The optimum pressure range for the entire system proved to be up to about 1 bar. While, in principle, higher pressures could be applied, their application is limited by higher safety measures and higher energy expenses.

The thus prepared gas mixture containing hydrogen, oxygen and hydrogen chloride and, if desired, inert gas, as well as a low amount of residual chlorosilanes, is then introduced, as known, e.g., from DE-OS No. 83 07 86, with the addition of suitable halides, into a reactor for the pyrogenic production of fine particle-size oxides by combustion. Suitable halides for the purpose of this invention are, e.g., germanium chloride for the production of germanium dioxide, titanium chloride for producing titanium dioxide, but especially silicon tetrachloride for making highly dispersed $SiO_2$. Whereas in the pyrogenic production of germanium dioxide and titanium dioxide products will always be obtained which are impure, due to the presence of $SiO_2$ resulting from the presence of chlorosilanes in the heating gas, the highly dispersed $SiO_2$ obtained from silicon tetrachloride, by the process of the invention is particularly pure. The hydrogen chloride-containing gas mixture obtained in the last mentioned process step may, after removal of the fine oxide particles, be adsorbed in about 18% aqueous hydrochloric acid and used for the formation of conc. hydrochloric acid. The hydrogen chloride of highest purity recoverable by dehydration is, e.g., excellently suitable for reintroduction in the processing stream for the production of trichlorosilane.

In the following, the process according to the invention is described with reference to the accompanying drawing which is a schematically-illustrated flow chart of the inventive process.

Referring now in detail to the drawing, waste gases containing chlorosilanes, hydrogen and hydrogen chloride, being obtained either by production of trichlorosilane in vessel 1, and/or by silicon deposition in vessel 2, and/or by silicon tetrachloride conversion in vessel 3, are subjected to condensation, either individually or in mixture, in a condenser 4. The chlorosilanes contained in the waste gases are thereby separated and may be reintroduced into the silicon deposition or silicon tetrachloride conversion vessel. To the mixture of hydrogen and hydrogen chloride remaining in the gaseous phase, e.g., air and silicon tetrachloride are added and the so-obtained mixture is burnt in a combustion chamber 5, forming highly dispersed $SiO_2$. The final gaseous phase will contain moist hydrogen chloride which, after processing in the adsorption and desorption device 6, is reintroduced into the production of trichlorosilane in vessel 1.

Thus, the process according to the invention affords the surprisingly simple possibility of a work-up of the waste gases resulting from the silicon production, which always contain hydrogen chloride, without requiring the separate step of removing the hydrogen chloride. Not only are the economic advantages remarkable—namely, that none of the ingredients contained in the waste gases remains unused, but it is a further important advantage that any detriment to the environment is avoided.

In the following, the invention will be more fully described in a number of examples, but it should be understood that these are given by way of illustration only and not by limitation.

EXAMPLE 1

The waste gases resulting in the production of polycrystalline elementary silicon by decomposition of trichlorosilane on heated carrier bodies in the presence of hydrogen, were first condensed at −50° C., whereby chlorosilanes still contained in the gases were removed. To the remaining gas mixture, which contains in addition to hydrogen, about 0.5% trichlorosilane, 0.3% silicon tetrachloride and about 7% hydrogen chloride, the air was added in an amount two and one half times that of the hydrogen present, and some silicon tetrachloride was also added, whereafter the gases were subjected to combustion, forming highly dispersed $SiO_2$. The hydrogen chloride remaining in the gaseous phase was finally adsorbed in 18% hydrochloric acid. From the concentrated hydrochloric acid thus obtained, anhydrous hydrogen chloride was prepared by distillation, cooling to −13° C., and drying with conc. sulfuric acid, whereupon it was reintroduced into the process stream or vessel for the production of trichlorosilane.

EXAMPLE 2

Waste gas from the conversion of silicon tetrachloride into trichlorosilane carried out in the presence of hydrogen, still contained about 12% hydrogen chloride after the chlorosilanes had been removed by condensation at −50° C., also contained were traces of chlorosilanes in addition to the main component hydrogen. In a manner comparable to the method described in Example 1, highly dispersed $SiO_2$ was produced in an oxyhydrogen flame after air and silicon tetrachloride addition to the gas mixture.

The hydrogen chloride remaining in the gaseous phase was also recovered as described in Example 1 and returned into the process stream or vessel for production of trichlorosilane.

EXAMPLE 3

In the same manner, the waste gas from the trichlorosilane production can be worked up. After the chlorosilanes have been removed by condensation at −50° C., the waste gas consists of about 74% hydrogen, 25% hydrogen chloride and 1% residual chlorosilanes. By adding air in an amount two and a half times that of the hydrogen present, and also adding silicon tetrachloride, highly dispersed $SiO_2$ is produced by means of an oxyhydrogen flame.

The hydrogen chloride remaining in the gaseous phase was also recovered as described in Example 1 and returned into the process stream or vessel for production of trichlorosilane.

While only several examples of the present invention have been shown and described, it is obvious that many changes and modifications may be made thereunto without departing from the spirit and scope of the invention.

What is claimed is:

1. A process for processing waste gases comprising a gas mixture including chlorosilanes, hydrogen and hydrogen chloride, comprising the steps of:
   (a) removing the chlorosilanes contained in the waste gas mixture by condensation;
   (b) adding to the remaining gas mixture an oxygen-containing gas;
   (c) adding at least one chloride selected from the group consisting of germanium chloride, titanium chloride and silicon tetrachloride to the gas mixture resulting from step (b) and subjecting the same to combustion for the pyrogenic formation of oxide particles; and
   (d) recovering the hydrogen chloride remaining in the gas mixture following step (c) for reuse.

2. The process according to claim 1, wherein to the gas mixture formed in step (b) silicon tetrachloride is added for the pyrogenic formation of highly dispersed $SiO_2$ in step (c).

3. The process according to claim 1, wherein the oxygen-containing gas added in step (b) is air.

4. The process according to claim 1, wherein said recovered hydrogen chloride is returned to a process stream for the production of trichlorosilane.

* * * * *

UNITED STATES PATENT AND TRADEMARK OFFICE
CERTIFICATE OF CORRECTION

PATENT NO. : 4,515,762

DATED : MAY 7, 1985

INVENTOR(S) : GRIESSHAMMER ET AL

It is certified that error appears in the above-identified patent and that said Letters Patent are hereby corrected as shown below:

Cover page, [73], Assignee's address, change "Burgenhausen" to --Burghausen--.

Signed and Sealed this

Seventh Day of January 1986

[SEAL]

Attest:

Attesting Officer

DONALD J. QUIGG

Commissioner of Patents and Trademarks